US008037484B2

(12) United States Patent
Backhouse et al.

(10) Patent No.: US 8,037,484 B2
(45) Date of Patent: Oct. 11, 2011

(54) BUILDING COMPOUND EXTENSIBLE AJAX APPLICATIONS

(75) Inventors: Richard A. Backhouse, Apex, NC (US); William P. Higgins, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/772,884

(22) Filed: Jul. 3, 2007

(65) Prior Publication Data
US 2009/0013336 A1    Jan. 8, 2009

(51) Int. Cl.
G06F 3/00  (2006.01)
G06F 9/44  (2006.01)
G06F 9/46  (2006.01)
G06F 13/00  (2006.01)

(52) U.S. Cl. ........................................ 719/328
(58) Field of Classification Search ............. 719/328
See application file for complete search history.

(56) References Cited

U.S. PATENT DOCUMENTS

| | | | |
|---|---|---|---|
| 6,601,114 B1 * | 7/2003 | Bracha et al. | 719/332 |
| 2002/0156815 A1 * | 10/2002 | Davia | 707/517 |
| 2004/0143835 A1 * | 7/2004 | Dattke et al. | 719/315 |
| 2006/0026591 A1 * | 2/2006 | Backhouse et al. | 717/177 |
| 2006/0085439 A1 * | 4/2006 | Sawyer | 707/100 |
| 2007/0239985 A1 * | 10/2007 | Bernabeu-Auban et al. | 713/168 |
| 2007/0261066 A1 * | 11/2007 | Miyamoto et al. | 719/320 |

OTHER PUBLICATIONS

John Arthorne et al, "Official Eclipse 3.0 FAQs", Jun. 28, 2004.*
Paul Krill, "IBM hails Jazz collaboration platform", Mar. 21, 2007, pp. 1-2.*

* cited by examiner

Primary Examiner — Andy Ho
Assistant Examiner — Timothy A. Mudrick
(74) Attorney, Agent, or Firm — Dillon & Yudell LLP

(57) ABSTRACT

A method of building compound extensible Asynchronous JavaScript And eXtensible Markup Language (AJAX) applications. A server-side web component utility searches an extension registry for Jazz web User Interface (UI) components and generates cached strings of JavaScript code based on the Jazz web UI components. When a browser accesses a Jazz web UI home page, the web component utility uses script tags to download the cached strings of JavaScript code. The web component utility executes the cached strings of JavaScript code and registers multiple available Jazz web UI components with an AJAX package management system. The web component utility serializes a subset of the extension registry that includes multiple extension points declared within the available Jazz web UI components. The Jazz web browser-based functionality downloads the extension registry subset data, parses the data, and makes the data available through one or more JavaScript Application Programming Interfaces (APIs).

3 Claims, 2 Drawing Sheets

BUILDING COMPOUND EXTENSIBLE AJAX APPLICATIONS

BACKGROUND OF THE INVENTION

The present invention relates in general to data processing systems and in particular to composite web applications. Still more particularly, the present invention relates to an improved method and system for building compound extensible Asynchronous JavaScript And eXtensible Markup Language (AJAX) applications.

Composite applications enable multiple independent groups to contribute components of an application. The multiple independently developed and/or contributed components are executable within the same runtime context. However, conventional methods of implementing composite web applications (e.g., IBM's WebSphere Portal, Eclipse, and Microsoft's .NET) do not address the relatively new domain of rich web applications, such as Asynchronous JavaScript And eXtensible Markup Language (AJAX). AJAX is a development technique for creating interactive web applications that makes web pages feel more responsive by exchanging small amounts of data between a web page and a web server and making page user interface updates incrementally, without having to reload the entire page.

Java is an object-oriented programming language, which utilizes high-level syntax derived from C and C++, but includes a simpler object model with fewer low-level facilities. Java programs are typically compiled into "bytecode", which can either be interpreted at run time or compiled into native machine code for execution. Java programs utilize configurable security features to enable selective restriction of network and/or file access operations. AJAX utilizes a client side script language, such as JavaScript, along with eXtensible Markup Language (XML) to enable the creation of the initial conditions for the evolution of dynamic, intuitive, complex, and data-centric user interfaces in web pages. AJAX thus increases the speed, interactivity, and ease-of-use of web pages.

SUMMARY OF AN EMBODIMENT

Disclosed are a method, system, and computer storage medium for building compound extensible Asynchronous JavaScript And eXtensible Markup Language (AJAX) applications. AJAX is a development technique for creating interactive web applications that makes web pages feel more responsive by exchanging small amounts of data between a web page and a web server and making page user interface updates incrementally, without having to reload the entire page. A server-side web component utility searches an extension registry for Jazz web User Interface (UI) components and generates cached strings of JavaScript code based on the Jazz web UI components. Jazz web components are defined as web modules that extend a particular extension point (e.g., com.ibm.team.repository.web.webBundles), thereby allowing the component searching utility to differentiate web UI modules from other modules and make web UI module resources available to remote systems by giving them a Uniform Resource Identifier (URI) namespace on the server (e.g. /web/[bundle-id]). When a browser accesses a Jazz web UI home page, the web component utility uses script tags to download and load the cached strings of JavaScript code. The web component utility executes the cached strings of JavaScript code and registers multiple available Jazz web components with an AJAX package management system. The web component utility serializes a subset of the extension registry that includes multiple extension points declared within the available Jazz web components, and the Jazz web browser-based functionality downloads this extension registry subset data, parses it, and downloads and makes it available through one or more JavaScript Application Programming Interfaces (APIs).

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer storage medium for building compound extensible Asynchronous JavaScript And eXtensible Markup Language (AJAX) applications. As utilized herein, AJAX is defined as a development technique for creating interactive web applications that makes web pages feel more responsive by exchanging small amounts of data between a web page and a web server and making page user interface updates incrementally, without having to reload the entire page.

Figure 1:
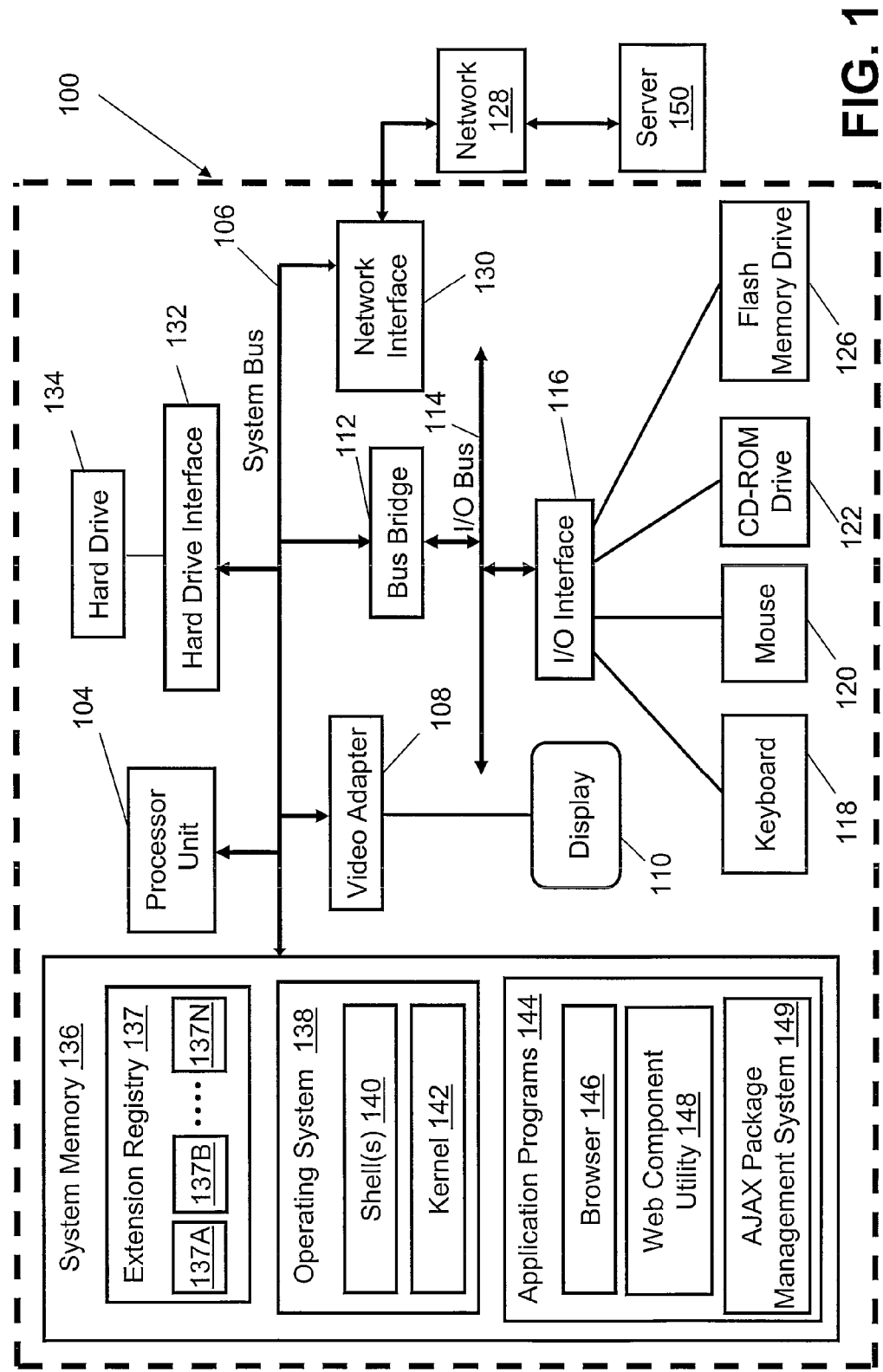
FIG. 1 depicts a high level block diagram of an exemplary computer, according to an embodiment of the present invention.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 is configured similarly to computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an Operating System (OS) 138, application programs 144, and an extension registry 137. Extension registry 137 includes multiple extension points 137A through 137N, where N is an integer. In another embodiment, extension registry 137 may instead be located in server 150.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a web component utility 148, and an AJAX package management system 149. Web component utility 148, extension registry 137, and/or AJAX package management system 149 perform the functions illustrated in FIG. 2, which is discussed below.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
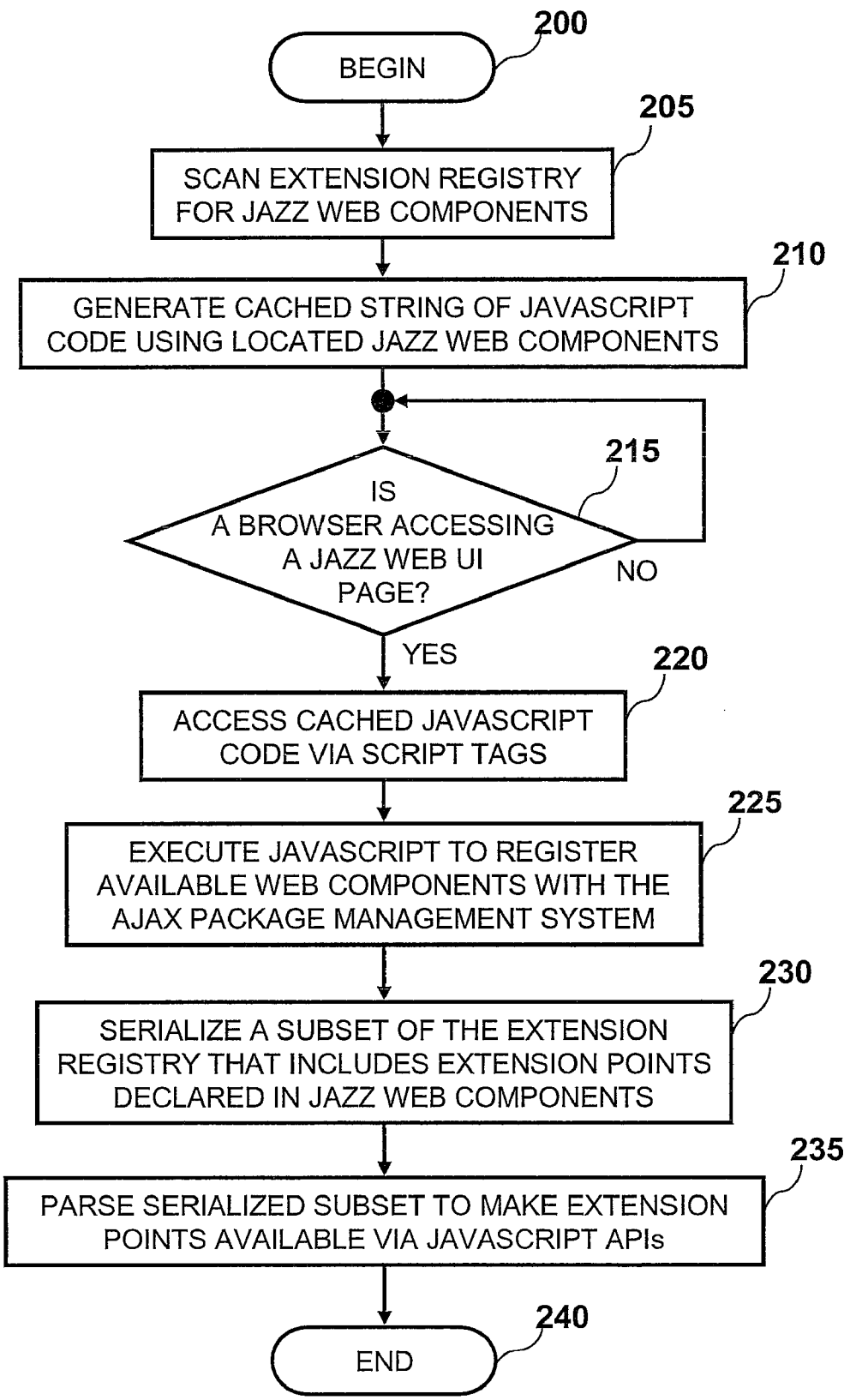
FIG. 2 is a high level logical flowchart of an exemplary method of building compound extensible Asynchronous JavaScript And eXtensible Markup Language (AJAX) applications, according to an embodiment of the invention.

With reference now to FIG. 2, there is illustrated a high level logical flowchart of an exemplary method of building compound extensible AJAX applications, according to an embodiment of the invention. The process begins at block 200 in response to computer 100 accessing network 128. Web component utility 148 scans extension registry 137 for Jazz web components, as depicted in block 205. As utilized herein, Jazz web components are defined as web modules that extend an extension point (e.g., com.ibm.team.repository.web.webBundles) and are automatically exposed on the network at the URI [server-root]/web/[module-id]. In one embodiment, the Jazz web components are Open Services Gateway initiative (OSGi) bundles developed by emerging Equinox server-side middleware. As utilized herein, OSGi is defined as an open standards initiative, which specifies a Java-based service platform that can be remotely managed. In particular, OSGi provides a framework that defines an application life cycle model and a service registry.

Web component utility 148 generates cached strings of JavaScript code using the located Jazz web components, as shown in block 210. At block 215, web component utility 148 determines whether a browser, such as browser 148, is accessing the Jazz web User Interface (UI). If browser 148 is not accessing the Jazz web UI, the process returns to block 215. If browser 148 accesses the Jazz web UI, web component utility 148 accesses the cached JavaScript by utilizing simple script tags, as depicted in block 220. Web component utility 148 executes the JavaScript to register available Jazz web components with AJAX package management system 149, as shown in block 225. In one embodiment, AJAX package management system may be a Dojo JavaScript Toolkit. As utilized herein, a Dojo JavaScript Toolkit is defined as a modular open source JavaScript Toolkit (also referred to as a library) that is designed to enable the rapid development of JavaScript and/or AJAX based applications and web sites.

Web component utility 148 serializes a subset of extension registry 137, which includes extension points 137A through 137N that are declared in the registered Jazz web components, as depicted in block 230. In one embodiment, the serialized subset of extension registry 137 utilizes a JavaScript Object Notification (JSON) format (i.e., a lightweight data interchange format). Web component utility 148 parses the serialized subset to make extension points 137A through 137N available via JavaScript Application Programming Interfaces (APIs), as shown in block 235, and the process terminates at block 240.

In one embodiment, the JavaScript APIs are clones of one or more APIs within extension registry 137 (e.g., "org.eclipse.core.runtime.IExtensionRegistry"). The extended Jazz extension points 137A through 137N thus make the current "web perspective" available in the "web workbench", thereby enabling the web perspective to be automatically loaded the first time that a user enters the web perspective. Users may subsequently declare and extend Jazz extension points 137A through 137N by utilizing conventional methods and tools that are used to create Eclipse extension points. Furthermore, users may easily access Jazz extension points 137A through 137N via local JavaScript objects.

The present invention thus provides a method of building compound extensible AJAX applications. Web component utility 148 searches extension registry 137 for Jazz web components and generates cached strings of JavaScript code based on the Jazz web components. When a browser accesses a Jazz web user interface (UI) home page, web component utility 148 uses script tags to access the cached strings of JavaScript code. Web component utility 148 executes the cached strings of JavaScript code and registers multiple available Jazz web components with AJAX package management system 149. Web component utility 148 serializes a subset of extension registry 137 that includes multiple extension points 137A through 137N declared within the available Jazz web components. Web component utility 148 parses the subset to make extension points 137A through 137N available through one or more JavaScript application programming interfaces (APIs).

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 2) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs.

While the invention has been particularly shown and described with reference to a preferred embodiment, it will be understood by those skilled in the art that various changes in form and detail may be made therein without departing from the spirit and scope of the invention.

What is claimed is:

1. A method comprising:
a computer searching an extension registry for a plurality of Jazz web User Interface (UI) components;
the computer generating cached strings of JavaScript code based on said plurality of Jazz web UI components; and
in response to a browser accessing a Jazz web UI home page:
the computer downloading said cached strings of JavaScript code with a plurality of script tags;
the computer executing said cached strings of JavaScript code;
the computer registering a plurality of available Jazz web UI components with an Asynchronous JavaScript And eXtensible Markup Language (AJAX) package management system, wherein said plurality of Jazz web UI components includes a plurality of Open Services Gateway initiative (OSGi) bundles that include JavaScript files, HyperText Markup Language (HTML) files, and Cascading Style Sheet (CSS) files, and wherein said AJAX package management system includes an open source Dojo JavaScript Toolkit;
the computer serializing a subset of said extension registry, wherein said subset includes a plurality of server side extension points declared within said plurality of available Jazz web UI components; and
the computer parsing said subset to make said plurality of server side extension points available through one or more JavaScript Application Programming Interfaces (APIs), wherein said plurality of server side extension points are lazily loaded when a web perspective is entered for a first time.

2. A computer system comprising:
a processor unit;
a network interface coupled to said processor unit, wherein said network interface enables said computer system to communicate with a plurality of servers;
a system memory coupled to said processor unit;
an extension registry within said system memory; and
a web component utility within said system memory, wherein said web component utility provides the functions of:
searching said extension registry for a plurality of Jazz web User Interface (UI) components;
generating cached strings of JavaScript code based on said plurality of Jazz web UI components; and
in response to a browser accessing a Jazz web UI home page:
downloading said cached strings of JavaScript code with a plurality of script tags;
executing said cached strings of JavaScript code;
registering a plurality of available Jazz web UI components with an Asynchronous JavaScript And eXtensible Markup Language (AJAX) package management system wherein said plurality of Jazz web UI components comprises a plurality of Open Services Gateway initiative (OSGi) bundles that include JavaScript files, HyperText Markup Language (HTML) files, and Cascading Style Sheet (CSS) files, and wherein said AJAX package management system comprises an open source Dojo JavaScript Toolkit;
serializing a subset of said extension registry, wherein said subset includes a plurality of server side extension points declared within said plurality of available Jazz web UI components; and
parsing said subset to make said plurality of server side extension points available through one or more JavaScript Application Programming Interfaces (APIs), wherein said plurality of server side extension points are lazily loaded when a web perspective is entered for a first time.

3. A computer storage medium encoded with a computer program that, when executed by a computer, causes the computer to perform:
searching an extension registry for a plurality of Jazz web User Interface (UI) components;
generating cached strings of JavaScript code based on said plurality of Jazz web UI components; and
in response to a browser accessing a Jazz web UI home page:
downloading said cached strings of JavaScript code with a plurality of script tags;
executing said cached strings of JavaScript code;
registering a plurality of available Jazz web UI components with an Asynchronous JavaScript And eXtensible Markup Language (AJAX) package management system wherein said plurality of Jazz web UI components comprises a plurality of Open Services Gateway initiative (OSGi) bundles that include JavaScript files, HyperText Markup Language (HTML) files, and Cascading Style Sheet (CSS) files, and wherein said AJAX package management system comprises an open source Dojo JavaScript Toolkit;
serializing a subset of said extension registry, wherein said subset includes a plurality of server side extension points declared within said plurality of available Jazz web UI components; and
parsing said subset to make said plurality of server side extension points available through one or more JavaScript Application Programming Interfaces (APIs), wherein said plurality of server side extension points are lazily loaded when a web perspective is entered for a first time.

* * * * *